G. L. CHASE.
SEAT CUSHION.
APPLICATION FILED FEB. 17, 1919.

1,303,852.  Patented May 20, 1919.

Inventor
George L. Chase
By his Attorney
Frank Warren

UNITED STATES PATENT OFFICE.

GEORGE L. CHASE, OF SEATTLE, WASHINGTON.

SEAT-CUSHION.

1,303,852.   Specification of Letters Patent.   Patented May 20, 1919.

Application filed February 17, 1919. Serial No. 277,672.

*To all whom it may concern:*

Be it known that I, GEORGE L. CHASE, a citizen of the United States, residing at Seattle, in the county of King and State of Washington, have invented a certain new and useful Improvement in Seat-Cushions, of which the following is a specification.

My invention relates to improvements in means for preventing the breaking of springs in seat cushions of the type commonly used in automobiles and the object of my invention is to provide a cushion wherein air is used to reinforce the springs and help to absorb the shock due to sudden and heavy pressure on the cushion.

A further object of my invention is to provide a cushion that is equipped with air valve mechanism which will not be affected in any way when the springs are working under normal conditions but which will be unclosed if the cushion is subjected to an unusually heavy shock thereby causing the air to be momentarily compressed within the cushion body so that it will reinforce the springs and by sustaining a portion of the shock will prevent the springs from being compressed to a breaking point.

My invention consists in the novel construction, adaptation and combination of parts as will be more clearly hereinafter described and claimed.

Figure 1:
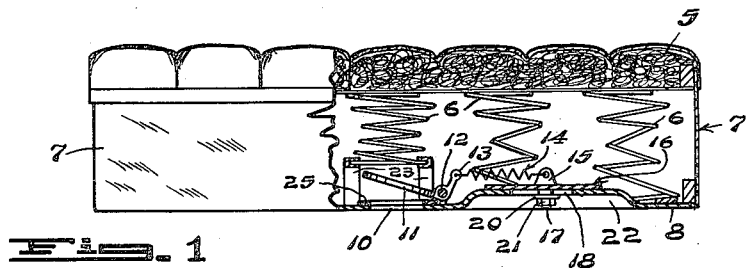
Figure 2:
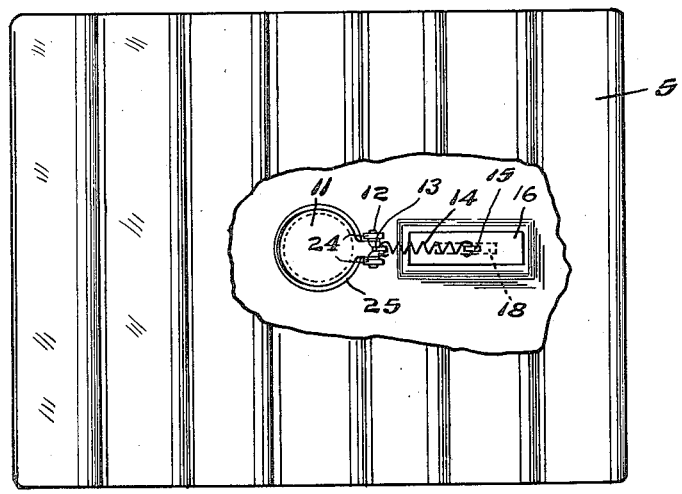
Figure 3:
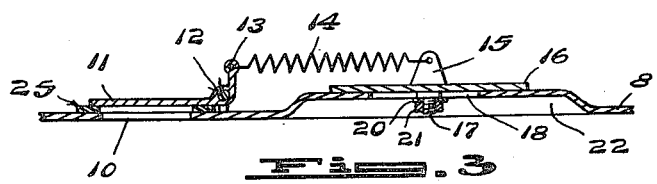

In the accompanying drawings, Figure 1 is a view partly in cross-section and partly in side elevation of a cushion constructed in accordance with this invention;

Fig. 2 is a plan view of the same with parts broken away to reveal the construction of the valve mechanism within, and Fig. 3 is a fragmentary sectional view on an enlarged scale showing the valve in a closed position.

In an automobile seat cushion of the type now in common use considerable trouble is caused on account of the breaking of the cushion springs. The greater portion of this breakage is caused by excess compression due to the sudden shock of the heavy weight of a person's body striking the cushion violently as when the automobile strikes a bump or rut in the roadbed and the person is thrown about and strikes heavily on the cushion.

My invention contemplates pneumatic means that will operate to reinforce the cushion springs only when the cushion is subjected to a sudden shock and will thereby prevent the breakage of the same.

Referring to the drawings, throughout which like reference numerals indicate like parts, the numeral 5 designates the padded upper portion of a cushion seat of the type commonly used in automobiles which padded portion 5 is supported upon coil springs 6 that rest upon suitable supports that form the bottom of the cushion.

The sides 7 of the cushion are preferably formed of flexible material that is fairly impervious to the passage of air, as rubberized cloth, and the padding of the upper portion 5 may be constructed so that air will not easily pass therethrough.

The lower side of the cushion is provided with a solid bottom 8 which together with the upper padded portion 5 and side walls 7 form a compartment in which the springs 6 are located and which is sufficiently tight to offer considerable resistance to the sudden outlet of air.

The bottom 8 is provided, preferably near its center, with an opening 10 of suitable size to freely permit the passage of air therethrough when the cushion is working under normal conditions.

The opening 10 is adapted to be closed by a flap valve 11 that is mounted on a pivot pin 12 and is provided with an upwardly projecting arm 13 to which is attached one end of a tension spring 14, the other end of which being attached to an upwardly projecting lug 15 on a plate 16.

The plate 16 is provided with a downwardly projecting stud 17 that extends through a slot 18 in the cushion bottom 8 and has a washer 20 and nut 21 provided thereon by which the plate may be secured in an adjusted position lengthwise of the slot. That portion of the stud 17 that operates within the slot 18 may be elongated to serve as a guide and prevent the plate 16 from turning sidewise when the nut 21 is loosened.

The cushion bottom 8 may be made of sheet metal and is preferably indented at the location of the slot 8 to form a recess 22 for the nut 21 so that the nut will not protrude and be in the way when the cushion is placed on a flat surface.

If it is found necessary to locate a spring directly above the valve 11 such spring may be supported on arched member 23 as shown in Fig. 1.

The pivot pin 12 may be mounted in brackets 24 that are secured to the cushion bottom 8.

A washer 25 of soft material, as rubber or felt, will preferably be cemented around the edge of the opening 10 to insure an air tight contact with the flap valve 11 and to deaden the sound that might be occasioned by the closing of such valve.

When the cushion is carrying a load and working under normal conditions the flap valve 11 will be held in an open position as shown in Fig. 1 the rush of air through the opening 10 not being great enough to close such valve against the tension of the spring 14 but if the cushion is subjected to an unusually quick heavy shock the outward rush of the air through the opening 10 will be sufficient to overcome the tension of the spring and close the valve 11 thereby causing the air within the spring compartment of the cushion to be compressed and to reinforce the springs and assist in absorbing the shock before the springs are compressed enough to cause them to break. As soon as the shock has been arrested and the cushion starts to resume its normal working condition the flap valve 11 will again assume an open position.

Obviously changes may be made in the precise form of construction of the several parts of my invention without departing from the spirit thereof.

What I claim is:

1. The combination with a spring cushion having a closed compartment that is provided with a valve opening of a flap valve adapted to close said opening, a tension spring to normally hold said valve in an open position said spring being arranged to permit said valve to close in response to the outward passage of an excess quantity of air through said opening, and means for varying the tension of said spring.

2. A seat cushion comprising a padded seat portion, a solid bottom wall having an opening disposed therein, flexible side walls connecting said seat portion and said bottom wall and forming an air tight compartment, springs in said compartment for resiliently supporting said padded seat portion, a flap valve for closing the opening in said bottom wall, a tension spring to normally hold said flap valve in an open position said spring being arranged to permit said flap valve to close if a sudden violent shock is imparted to the seat portion of said seat cushion, and means for varying the tension of said spring.

3. A seat cushion of the class described comprising a padded seat portion, a solid bottom wall having a centrally arranged opening therein, flexible side walls connecting said seat portion and said bottom wall and forming a substantially air tight closed compartment, springs in said compartment for resiliently supporting said seat portion, a pivotally mounted flap valve arranged to close the opening in said bottom wall, an upwardly projecting arm on said flap valve, a tension spring connected at one end with said arm, a plate connected with the other end of said tension spring, a depressed portion in said bottom wall, said depressed portion having a slot formed therein, a stud on said plate arranged to project through said slot, said plate serving as a closure for said slot, and a nut on said slot for holding said plate in adjusted positions to vary the tension of said spring said nut being disposed within said depression.

In witness whereof, I hereunto subscribe my name this 11th day of February A. D. 1919.

GEORGE L. CHASE.